US012679530B2

(12) United States Patent
Pasic et al.

(10) Patent No.: US 12,679,530 B2
(45) Date of Patent: Jul. 14, 2026

(54) LANDING GEAR MAIN FITTING WITH INTEGRAL SHOCK ABSORBER

(71) Applicant: SAFRAN LANDING SYSTEMS CANADA INC., Ajax (CA)

(72) Inventors: Zoran Pasic, Etobicoke (CA); Michael Saccoccia, Seagrave (CA); Randy Lee, Oshawa (CA)

(73) Assignee: Safran Landing Systems Canada Inc., Ajax (CA)

( * ) Notice: Subject to any disclaimer, the term of this patent is extended or adjusted under 35 U.S.C. 154(b) by 509 days.

(21) Appl. No.: 18/049,918

(22) Filed: Oct. 26, 2022

(65) Prior Publication Data

US 2024/0140597 A1 May 2, 2024

(51) Int. Cl.
| | |
|---|---|
| *F16F 9/06* | (2006.01) |
| *B64C 25/60* | (2006.01) |
| *F16F 9/20* | (2006.01) |
| *F16F 9/32* | (2006.01) |

(52) U.S. Cl.
CPC .............. *B64C 25/60* (2013.01); *F16F 9/062* (2013.01); *F16F 9/063* (2013.01); *F16F 9/20* (2013.01); *F16F 9/3221* (2013.01)

(58) Field of Classification Search
CPC ... F16F 9/20; F16F 9/062; F16F 9/063; B64C 25/60
USPC ............................. 188/312; 267/64.26, 64.29
See application file for complete search history.

(56) References Cited

U.S. PATENT DOCUMENTS

| | | | | | |
|---|---|---|---|---|---|
| 2,349,244 | A | * | 5/1944 | Brown | B64C 25/22 |
| | | | | | 188/300 |
| 2,771,968 | A | * | 11/1956 | Mercier | F16F 9/20 |
| | | | | | 137/493 |
| 3,056,598 | A | | 10/1962 | Conway et al. | |
| 3,158,232 | A | * | 11/1964 | Doetsch | F16F 9/44 |
| | | | | | 188/312 |
| 3,352,386 | A | * | 11/1967 | Claude | F16F 9/20 |
| | | | | | 188/316 |
| 3,483,952 | A | * | 12/1969 | Cardwell | F16F 9/5126 |
| | | | | | 188/289 |
| 4,066,278 | A | * | 1/1978 | Takagi | B60G 21/0551 |
| | | | | | 280/124.152 |

(Continued)

FOREIGN PATENT DOCUMENTS

| | | | | | |
|---|---|---|---|---|---|
| CN | 102774247 | A | * | 11/2012 | F16F 9/182 |
| DE | 2601212 | A1 | * | 2/1977 | F16F 9/20 |

(Continued)

OTHER PUBLICATIONS

International Search Report and Written Opinion mailed Jan. 23, 2024, issued in corresponding International Application No. PCT/CA2023/051417, filed Oct. 25, 2023, 10 pages.

*Primary Examiner* — Thomas J Williams
(74) *Attorney, Agent, or Firm* — Christensen O'Connor Johnson Kindness PLLC

(57) ABSTRACT

A main fitting includes an elongate piston and a cylinder configured to slidingly receive the piston. A first end of the piston extends from a first end of the cylinder, and a second end of the piston extends from a second end of the cylinder. The first end of the cylinder comprises a bearing surface engaging the piston to limit translation of the piston relative to the cylinder to a longitudinal direction.

13 Claims, 9 Drawing Sheets

(56)                    References Cited

U.S. PATENT DOCUMENTS 4,381,857 A  *   5/1983  Cook ...................... F16F 9/063
                                                        244/104 FP
4,480,730 A     11/1984  Koller et al.
4,540,142 A      9/1985  Veaux et al.
4,867,286 A  *   9/1989  Taylor ...................... F16F 5/00
                                                        188/312
5,547,148 A      8/1996  Del Monte et al.
5,829,556 A  *  11/1998  Domange ............... F16F 9/348
                                                        188/312
6,216,831 B1 *   4/2001  Taylor .................. F16F 9/3207
                                                        188/312
6,789,652 B2 *   9/2004  Honig ...................... F16F 9/20
                                                        188/312
7,293,634 B2 *  11/2007  Rova .................... F16F 9/3405
                                                        188/322.22
8,181,756 B2 *   5/2012  Horikawa ............... F16F 9/182
                                                        188/312

8,448,900 B2      5/2013  Mellor et al.
 9,366,306 B2 *    6/2016  Miyasato .................. F16F 9/20
10,549,848 B2      2/2020  Klim et al.
10,625,849 B2      4/2020  Mellor
10,948,044 B2 *    3/2021  McCallister .......... F15B 15/204
2008/0111022 A1    5/2008  Lahargou et al.
2010/0181423 A1    7/2010  Martin et al.
2018/0001998 A1    1/2018  Bennett
2020/0231274 A1 *  7/2020  Goldring ................. B64C 25/10
2024/0140597 A1 *  5/2024  Pasic ...................... B64C 25/60

FOREIGN PATENT DOCUMENTS

DE          3437653 A   *   4/1986   ................ F16F 9/20
EP          1630449 A1  *   3/2006   ......... B60G 21/0551
EP          1950426 A2  *   7/2008   .......... F15B 15/1447
EP       2 210 811 B2       1/2018
FR          2400147 A   *   4/1979   ............ B60G 15/12
GB          1529579 A   *  10/1978   ................ F16F 9/06
WO       00/37822 A1        6/2000

* cited by examiner

LANDING GEAR MAIN FITTING WITH INTEGRAL SHOCK ABSORBER

BACKGROUND

Aircraft are typically equipped with landing gear that enables the aircraft to taxi, takeoff and safely land on the ground. Some aircraft utilize landing gear that is retractable, i.e., the landing gear reciprocates between a deployed (extended) position and a stowed (retracted) position. While the vehicle is on the ground, the landing gear is deployed and supports the vehicle. Such landing gear typically incorporate main fittings that cushion landing impacts or bump perturbations and dampen repeat oscillations as well as the tendency for an aircraft to rebound or "bounce." In this regard main fittings commonly include oleo struts that convert kinetic energy into heat by the use of a gas, providing elastic spring characteristics, and oil for dampening. In flight, the landing gear retracts, which reduces drag. The reduction in drag lowers fuel consumption and allows for higher cruise speeds. Examples of a known deployable and retractable main fittings are described in U.S. Pat. No. 10,549,848, issued to Klim et al., and currently assigned to Safran Landing Systems Canada, Inc., the disclosure of which is incorporated herein in its entirety.

Another common type of landing gear is a cantilevered landing gear, which is often used for nose landing gears (NLG) and/or main landing gears (MLG) in small or large commercial or military aircraft, as well as in the rotorcraft. In some aerospace applications, where there is a very limited stowage space for the landing gear in the airframe structure and there is a requirement for landing gear to absorb very high kinetic energy (high vertical descent velocity landings), a particular type of cantilevered landing gear with a fully protruding piston is used, i.e., a landing gear in which the piston extends from both the top and the bottom of the cylinder. In such designs, both, upper and lower bearings are directly attached to the main fitting/cylinder bore and provide dynamic sealing to the fully protruding piston. Such configurations are known to be complex, adding increased manufacturing and maintenance costs. Further, the geometries commonly found in such configurations result in complicated stress profiles that require increased weight.

SUMMARY

The present disclosure provides examples of a main fitting for a landing gear assembly with a shock absorber. Disclosed embodiments have simplified construction compared to known main fittings and enable different damping characteristics to be provided during the main fitting upstroke and rebound. In an embodiment, a main fitting includes an elongate piston and a cylinder configured to slidingly receive the piston. A first end of the piston extends from a first end of the cylinder, and a second end of the piston extends from a second end of the cylinder. The first end of the cylinder comprises a bearing surface engaging the piston to limit translation of the piston relative to the cylinder to a longitudinal direction.

In any embodiment, the piston is configured for reciprocating motion relative to the cylinder in the longitudinal direction.

In any embodiment, the cylinder comprises an annular groove proximate to or formed in the bearing surface, a dynamic seal being disposed within the groove and being sealingly engaged with the cylinder and the piston.

In any embodiment, the main fitting further comprising a bearing mounted to the second end of the cylinder, wherein the bearing engages the piston to limit translation of the piston relative to the cylinder to a longitudinal direction.

In any embodiment, the cylinder further comprises an inwardly projecting lip, the bearing being disposed between the lip and a locking ring mounted to the cylinder.

In any embodiment, the bearing comprising dynamic seal that sealingly engages the piston.

In any embodiment, a rebound assembly is mounted to the cylinder and extends radially outward.

In any embodiment, the rebound assembly allows fluid to flow therethrough at a first rate when the second end of the piston moves toward the first end of the cylinder and at a second rate when the first end of the piston moves toward the second end of the cylinder In any embodiment, the first rate is greater than the second rate.

In any embodiment, the rebound assembly comprises a rebound ring slidably mounted within a groove of a rebound ring retainer, the rebound ring retainer being mounted to the cylinder.

In any embodiment, the rebound ring engages a lower face of the groove during the upstroke.

In any embodiment, the rebound ring engages an upper face of the groove during the rebound.

In any embodiment, the main fitting is part of a landing gear assembly for an aircraft.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The detailed description set forth herein in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

The following discussion provides examples of a main fitting for landing gear assemblies and the like, wherein the main fitting has a simplified construction. Embodiments of the main fitting can be configured to provide different damping profiles during upstroke and rebound movement.

Figure 1:
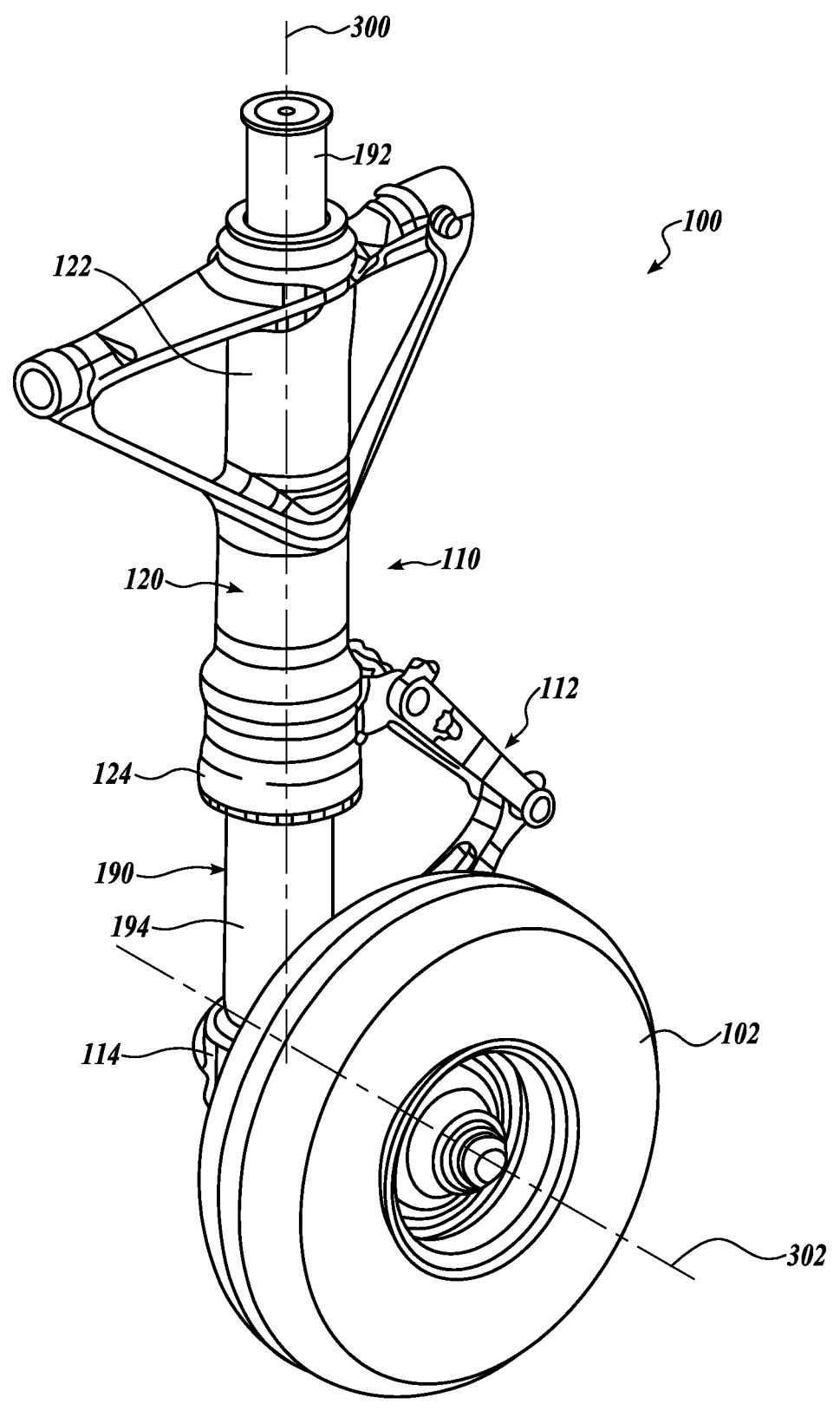
FIG. 1 shows an isometric view of an embodiment of a landing gear assembly with a main fitting having a protruding piston according to an aspect of the present disclosure.

FIG. 1 shows an embodiment a landing gear assembly 100 formed in accordance with aspects of the present disclosure. The illustrated landing gear assembly is suitable for use as a cantilevered landing gear and includes a fully protruding piston.

As shown in FIG. 1, the landing gear assembly 100 includes a main fitting 110 configured to be coupled to an aircraft (not shown). The main fitting 110 includes a piston 190 slidably associated with a cylinder 120 such that a first (upper) end 192 of the piston 190 extends upwardly from a first end 122 (upper portion) of the cylinder 120 and a second (lower) end 194 of the piston 190 extends downwardly from a second end 124 (lower portion) of the cylinder 120. A torque link 112 is coupled at one end to the cylinder 120 and at another end to the piston 190 to prevent rotation of the piston relative to the cylinder about longitudinal axis 300 while allowing translational movement of the piston 190 relative to the cylinder 120 along axis 300. Embodiments of the cylinder 120 are configured to be coupled to an aircraft in any suitable manner to mount the landing gear assembly 100 to the aircraft.

A wheel 102 is rotatably mounted to an axle fitting 114 about axis 302. The axle fitting 114 is coupled to the second end 194 of the piston 190 so that the wheel 102 and axis 302 move with the piston. In some embodiments, the landing gear assembly includes a plurality of wheels 102. When the aircraft is parked or taxiing, the wheel 102 of the landing gear 100 contacts the ground so that the landing gear assembly 100 (in conjunction with other landing gear assemblies, if any) at least partially support the aircraft.

As will be explained in greater detail below, the piston 190 is configured for reciprocating motion relative to the cylinder 120 between an extended position and a stroked (retracted) position. Moreover, the piston 190 and the cylinder 120 cooperate so that the main fitting 110 and, therefore, the landing gear assembly 100, provide damped spring characteristics that mitigate bounce and damp oscillations to provide a smoother ride during takeoff, landing, and taxiing maneuvers.

Figure 2:
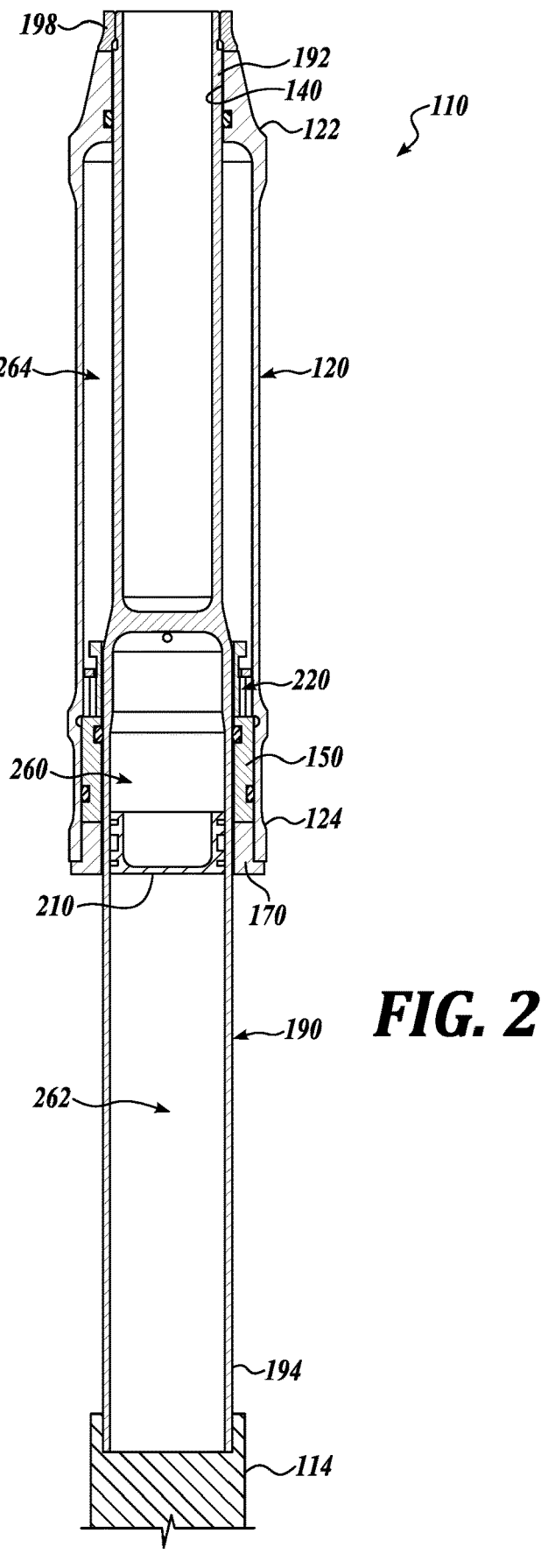
FIG. 2 shows a cross-sectional view of the main fitting of FIG. 1, wherein the main fitting includes an integral shock absorber, and the main fitting is in a fully extended position.
Figure 3:
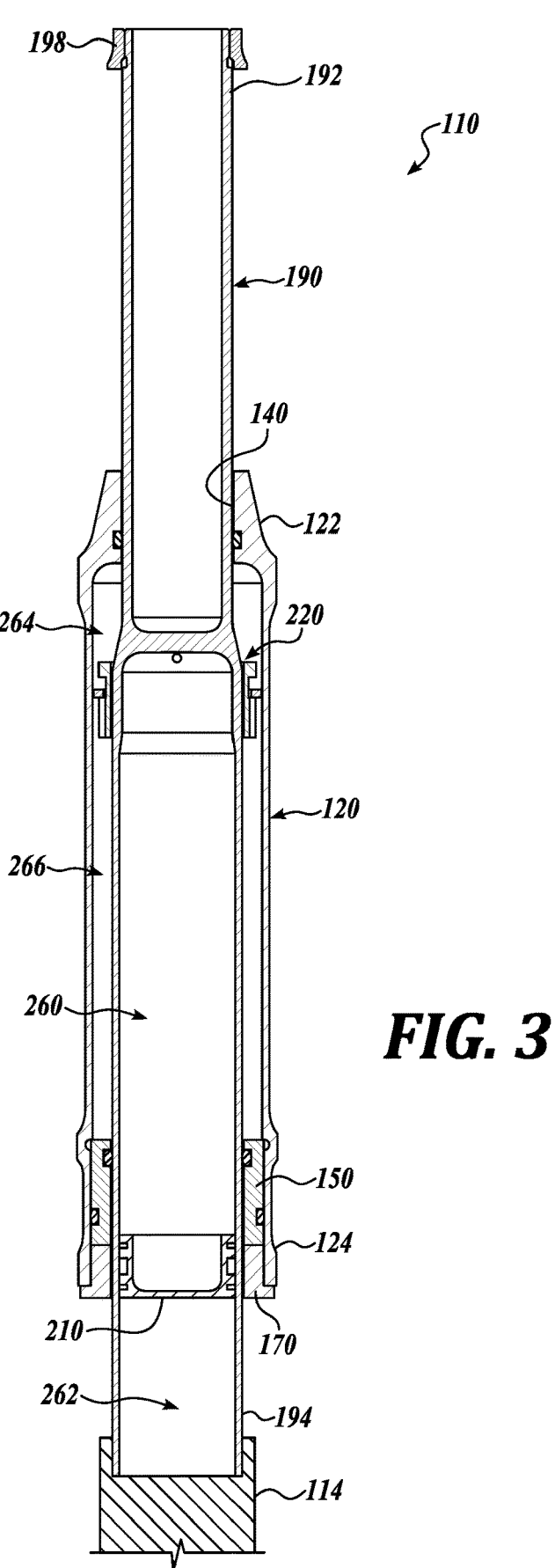
FIG. 3 shows a cross-sectional view thereof, wherein the main fitting is in a stroked position.

FIGS. 2 and 3 illustrate an embodiment of the main fitting 110 shown in FIG. 1. In FIG. 2, the main fitting 110 is fully extended, i.e., the piston 190 is at maximum extension from the bottom of the cylinder. Typically, full extension occurs when the aircraft is in flight, i.e., the wheels are not in contact with ground, and the weight of the wheels pulls the piston 190 down. An end stop 198 is mounted to the upper end of the piston 120 and contacts an upper portion of the cylinder 120 to limit extension of the main fitting 110 beyond the illustrated full extension.

In FIG. 3, the main fitting is in a stroked position, which typically occurs during a hard landing or when the aircraft encounters a bump at high speed, such as during takeoff or landing. In the stroked position, the piston 190 extends upwardly from the top of the cylinder 120. Further, the bottom of the piston 190 is positioned closer to the cylinder 120 so that the overall height of the landing gear assembly 100 is reduced.

Figure 4:
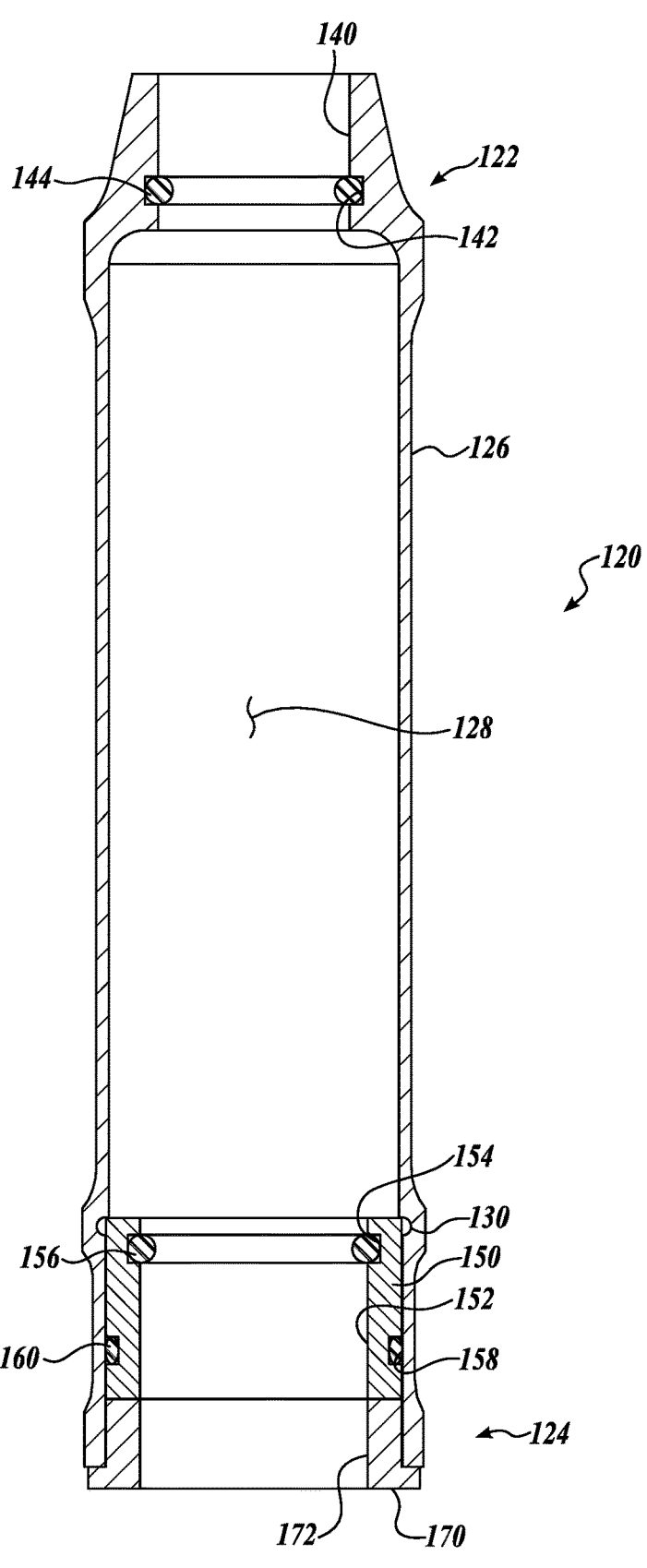
FIG. 4 is a cross-sectional view of a cylinder of the main fitting of FIG. 2.

FIG. 4 shows a cross-sectional view of the cylinder 120 of the main fitting 110. The cylinder 120 includes an elongate, generally cylindrical body 126 with a cavity 128 extending therethrough. A cylindrical internal bearing surface 140 is formed proximate to the first end 122 of the cylinder 120. The bearing surface 140 is sized and configured to correspond to the outer diameter of the first end 192 of the piston 190. In operation, the bearing surface 140 slidingly engages the piston 190 to limit radial movement of the piston while allowing the piston 190 to translate longitudinally relative to the cylinder 120.

An annular groove 142 is formed in the bearing surface 140 and is sized and configured to receive a dynamic seal 144 that sealingly engages the outer surface of the piston 190 to provide a fluid-tight seal between the piston 190 and the bearing surface 140 while allowing translational movement of the piston 190 relative to the cylinder 120. In an embodiment, the seal 144 is a known piston ring. In an embodiment, the seal 144 is any type of dynamic seal having suitable characteristics, including wear resistance, strength, heat resistance, etc.

Still referring to FIG. 4, a bearing 150 is mounted in the second (lower) end 124 of the cylinder 120. In an embodiment, an internally projecting lip 130 is formed in the cavity 128 of the cylinder 120 near the second end 124 of the cylinder. The annular bearing 150 is disposed within the cavity 128 and is secured against the lip 130 by a locking ring 170. In an embodiment, the locking ring 170 is mounted to the cylinder 120 by threaded engagement, press fitting, set screws, or any other suitable configuration. The locking ring 170 has a longitudinal aperture 172 extending therethough that is sized to receive the piston 190 therethrough without generating undue friction or wear. In an embodiment, the bearing 150 is secured to the cylinder by any suitable configuration.

In an embodiment, the bearing 150 includes an annular external groove 158 sized and configured to receive a seal 160, such as an O-ring. The seal 160 engages the groove 158 and the cylinder 120 to provide a fluid seal between the bearing 150 and the cylinder 120.

The bearing 150 further includes an internal annular bearing surface 152 sized and configured to slidingly receive the second end 194 of the cylinder 190. That is, the bearing surface 152 corresponds to the outer diameter of the second end 194 of the piston 190. In operation, the bearing surface 152 slidingly engages the piston 190 to limit radial movement of the piston while allowing the piston 190 to translate longitudinally relative to the cylinder 120.

Figure 5:
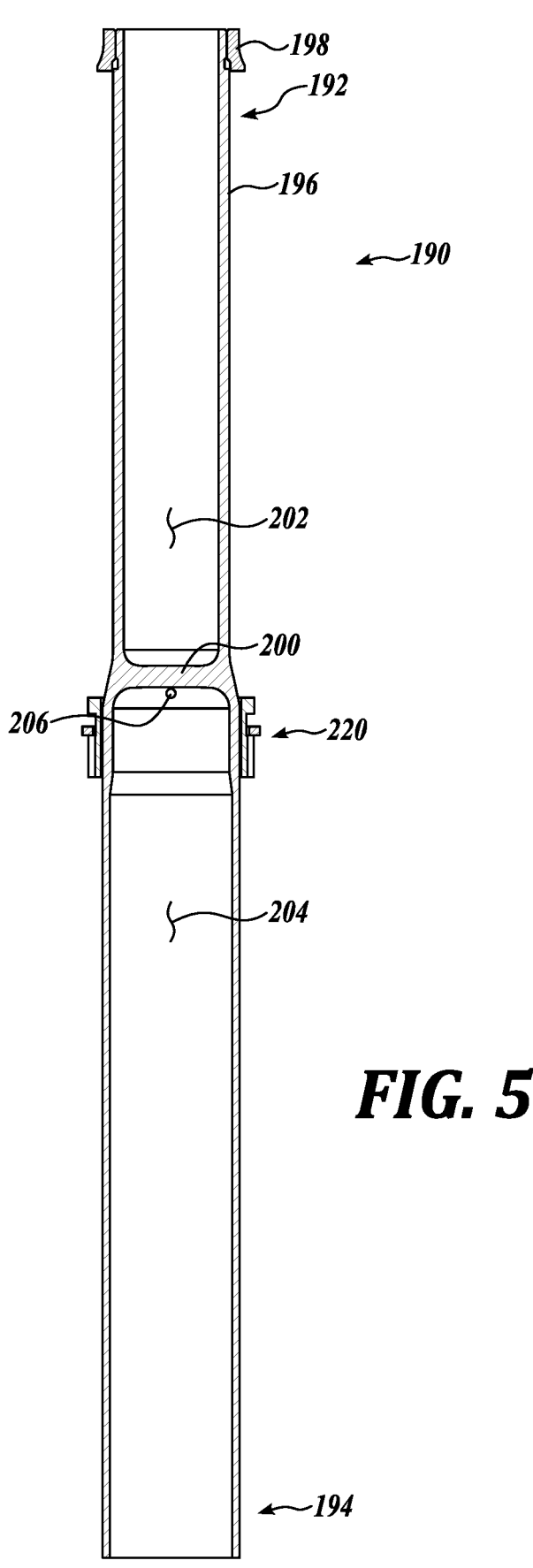
FIG. 5 is a cross-sectional view of a piston of the main fitting of FIG. 2.

FIG. 5 shows a cross-sectional view of the piston 190 of FIGS. 2 and 3. The piston 190 includes an elongate, generally cylindrical body 196 sized and configured to extend through the cavity 128 of the cylinder 120. When mounted to the cavity as shown in FIGS. 2 and 3, the piston 190 engages the bearing surfaces 140 and 152, which cooperate to limit radial movement of the cylinder while allowing translation of the piston 190 relative to the cylinder 120. The piston 190 also engages dynamic seals 144 and 156 (See FIG. 4) so that the area between the external surface of the piston 190 and the internal surface of the cavity 128 of the cylinder 120 is fluidly isolated from the environment, i.e., the internal portion of the cylinder 120 is sealed.

Figure 6:
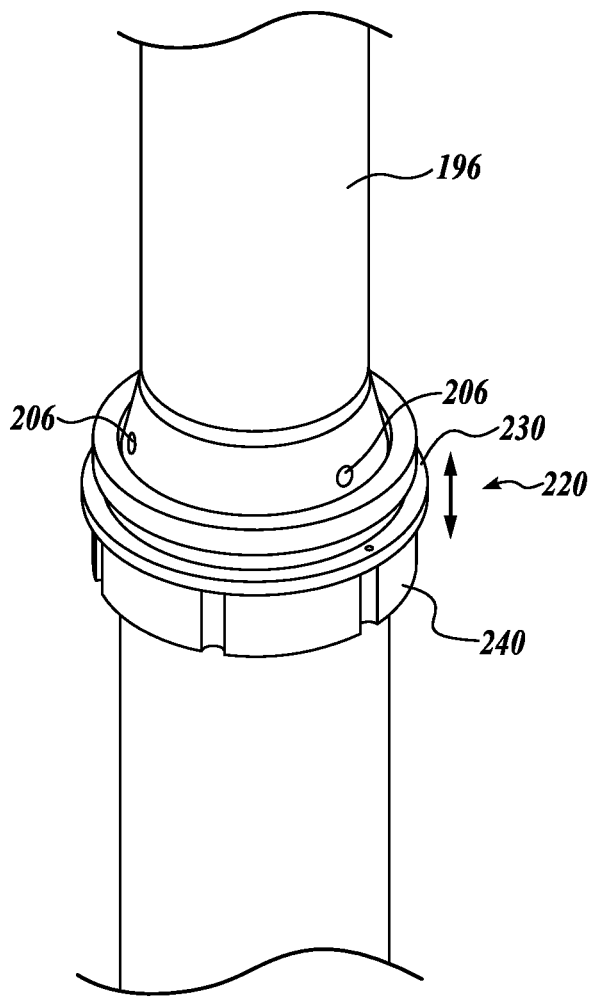
FIG. 6 is an isometric view of a rebound assembly of the piston of FIG. 5.

Referring again to FIG. 5, the body 196 has first cylindrical cavity 202 extending longitudinally downwardly from the first end 192 of the body and a second cylindrical cavity 204 extending upwardly from the second end 194 of the body. An internal wall 200 separates the first cavity 202 and the second cavity 204. As best shown in FIGS. 5 and 6, a plurality of orifices 206 are positioned circumferentially around the body 196 and extend radially through the wall of the second cavity 204.

Figure 7:
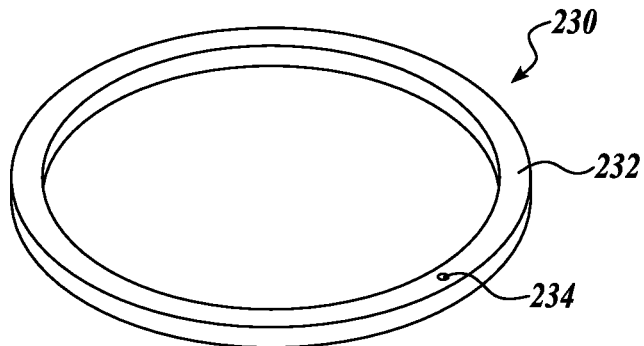
FIG. 7 is an isometric view of a rebound ring of the rebound assembly of FIG. 6.

Referring back to FIG. 5, in the illustrated embodiment, a rebound assembly 220 is mounted to the body 196 of the piston 190 proximate to and below the plurality of orifices 206. The rebound assembly 220 includes a rebound ring 230 mounted for reciprocating translation to a rebound ring retainer 240. As best shown in FIG. 7, the rebound ring 230 includes an annular body 232 with planar upper and lower surfaces. An orifice 234 extends in an axial direction through the body 232.

Figure 8:
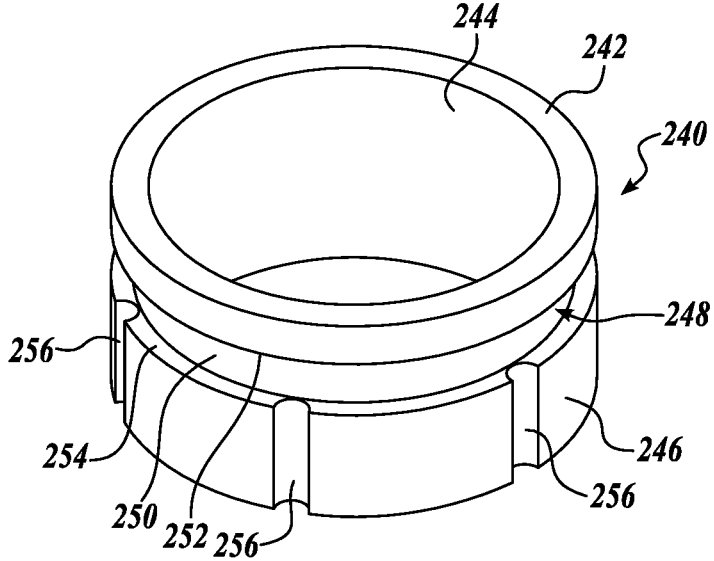
FIG. 8 is an isometric view of a rebound ring guide fitting of the rebound assembly of FIG. 6.

Referring to FIG. 8, the rebound ring retainer 240 has an annular body 242 with a cylindrical inner surface 244 and a cylindrical outer surface 246. An annular groove 248 extends circumferentially around the outside of the body 242. The groove 248 has a radial cross-section in the shape of a rectangle that defines inner face 250, and an upper face 252, and a lower face 254. The groove 248 is sized and configured to receive the rebound ring 230 and to allow for reciprocating translation of the rebound ring 230 in an axial direction between the upper face 252 and lower face 254.

Still referring to FIG. 8, a plurality of longitudinal scallops 256 is formed in the in the outside surface of the rebound ring retainer 240. Each scallop 256 extends from the lower face 254 of the groove to the bottom of the body 242. Referring back to FIGS. 5 and 6, the rebound ring retainer 240 and, therefore, the rebound assembly, is fixedly mounted to the body 196 of the piston 190.

Referring back to FIG. 3, when the main fitting 110 is assembled, the cylinder 120 and the piston 190 cooperate to at least partially define four internal chambers. A first chamber 260 is delimited by the piston 190 and a floating piston 210 that is slidingly disposed within the second cavity 204 of the piston 190 and is configured to maintain sealing engagement with the walls of the second cavity 204. A second chamber 262 is delimited by the piston 190, the floating piston 210, and the axle fitting 114. In other words, the floating piston 210 separates the second cavity 204 of the piston 190, an end of which is sealed by the axle fitting 114, into the first chamber 260 and the second chamber 262. As the floating piston 210 slides within the piston 190, the volume of one of the first and second chambers 260, 262 increases, while the other of the first and second chambers 260, 262 decreases.

Similar to known oleo struts, the first chamber 260 (above the floating piston 210) is filled with oil, and the second chamber 262 (below the floating piston 210) is filled with a gas, such as Nitrogen, under pressure. The floating piston 210 acts as a barrier between these two media.

Still referring to FIG. 3, the internal space between the outside surface of the piston 190 and the inside surface of the cylinder 120 is divided into a third chamber 264 and a fourth chamber 266 by the rebound assembly 220. The third chamber 264 is in fluid communication with the first chamber 260 through the orifices 206 formed in the piston 190. The third chamber 264 is also in fluid communication with the fourth chamber 266 through the rebound assembly 220.

The first, third, and fourth chambers 260, 264, 266 are at least partially filled with oil 270 or another damping fluid having suitable damping and operating properties. As will be explained with reference to FIGS. 9 and 10, movement of the oil between the chambers provides different damping during the instroke, i.e., compression stroke, (FIG. 9) and the rebound, i.e., extension stroke, (FIG. 10).

Figure 9:
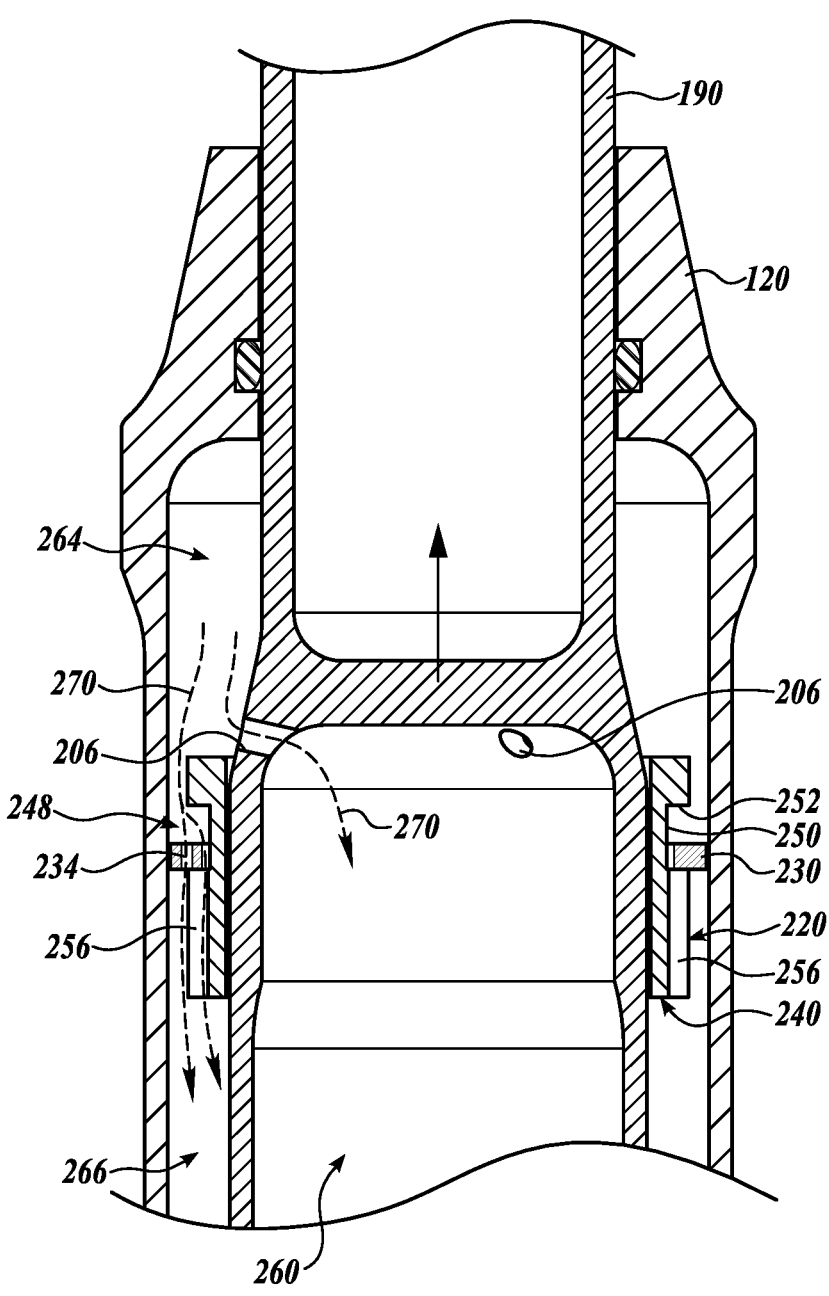
FIG. 9 is a cross-sectional view of the rebound assembly of FIG. 6, wherein the piston is moving toward the stroked position.

In FIG. 9, the piston 190 is moving upwardly relative to the cylinder 120, i.e., the main fitting 110 is in an upstroke motion. As the piston 190 moves up, the rebound ring 230 is driven to the bottom of the groove 248. This upward movement of the piston 190 also decreases the size of the third chamber 264, thereby increasing the pressure in the third chamber 264. This increased pressure drives oil 270 from the third chamber 264 into the first chamber 260 and the fourth chamber 266. More specifically, oil 270 passes from the third chamber 264 to the first chamber 260 through the orifices 206 formed in the piston 190. With the rebound ring at the bottom of the groove 248, oil passes from the third chamber 264 to the fourth chamber 266 through the orifice 234 in the rebound ring 230 and the gaps between the rebound ring 230 and the rebound ring retainer 240 formed by the scallops 256 of the rebound ring retainer 240.

During the compression stroke, the pressure in the third chamber 264 is higher than that of the first chamber 260, resulting in a net force that acts as a damping force against the motion of the piston 190 relative to the cylinder 120. As the volume of the first chamber 260 increases due to the addition of oil from the third chamber 264, the volume of the second chamber 262 is reduced. This reduction in volume compresses the gas in the second chamber 262, which provides a reaction force as a function of the polytropic gas-spring curve. At static conditions the gas and oil pressures are equal.

Figure 10:
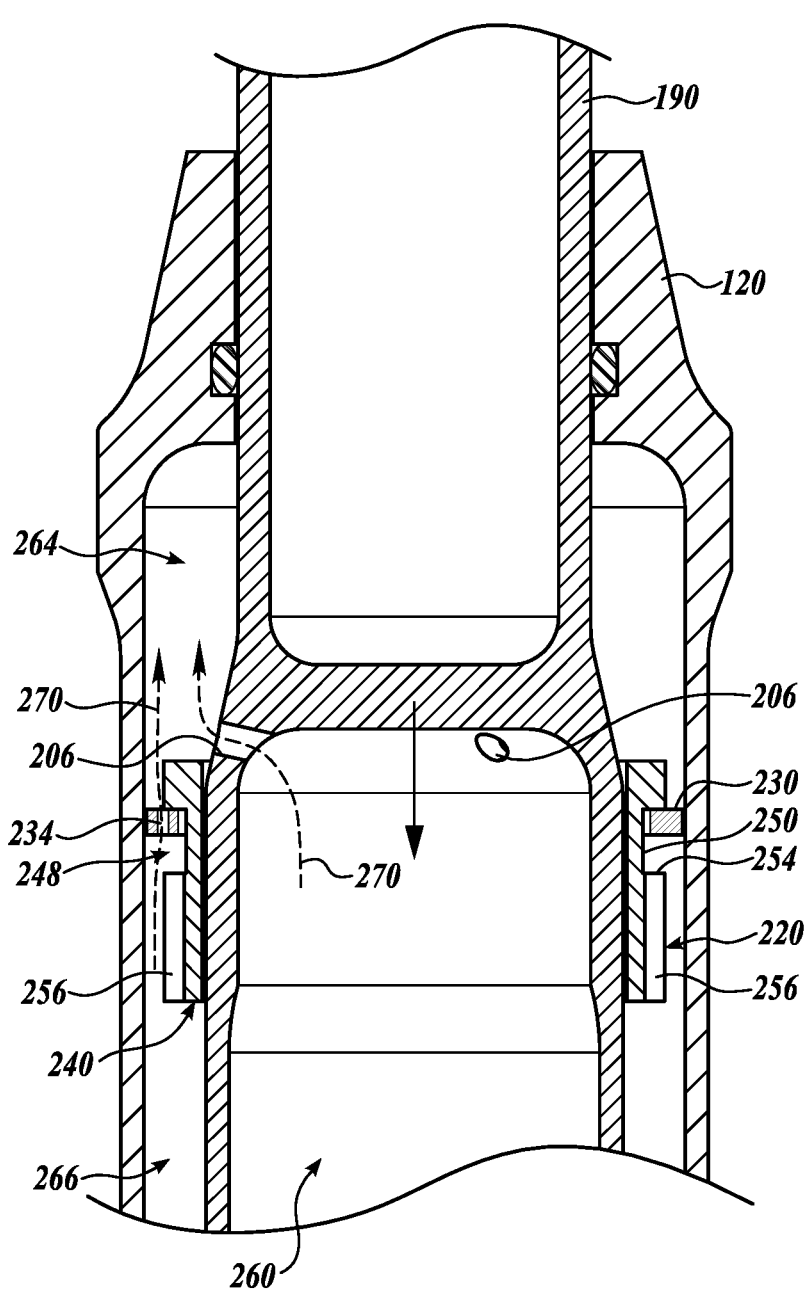
FIG. 10 is a cross-sectional view thereof, wherein the piston is moving toward the extended position.

In FIG. 10, the piston 190 is moving downwardly relative to the cylinder 120, i.e., the main fitting 110 is a rebound motion. As the piston 190 moves in a downward direction relative to the cylinder 120, the rebound ring 230 is driven to the top of the groove 248. This downward movement of the piston 190 decreases the size of the first chamber 260 and the fourth chamber 266, which drives oil into the third chamber 264. Oil passes from the first chamber 260 to the third chamber 264 through the orifices 206 formed in the piston 190. With the rebound ring at the top of the groove 248, the gaps formed by the scallops 256 are not present, and passage of oil from the fourth chamber 266 to the third chamber 264 is limited to the orifice 234 in the rebound ring 230. That is, the flow of oil through the rebound assembly 220 is reduced, which increases the damping during the rebound.

The extension stroke continues until the piston 190 bottoms out at the top of the cylinder 120, i.e., until the piston end stop 198 contacts the upper end 122 of the cylinder 120, thereby preventing further extension. During the extension stroke, rebound dynamic damping is created by flow across the rebound assembly 220, wherein the flow of oil out of the fourth chamber 266 into the third chamber 264 is restricted by the rebound ring assembly as described above.

Embodiments of the disclosed landing gear assembly provide damping characteristics that differ between the upstroke and the rebound. Further, the use of a bearing surface and dynamic seal in the upper portion of the cylinder provides results in a main fitting having a lower part count, better manufacturability, and a more robust configuration because of decreased areas of stress concentrations as compared to known main fittings.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A main fitting, comprising:
an elongate first piston having an internal piston cavity, the first piston having a first end and a second end, a wheel being mounted to the second end of the first piston;
a cylinder having an internal cylinder cavity, the first piston extending through the cylinder cavity and being configured for reciprocating motion between an extended position and a stroked position, the first end of the first piston extending from a first end of the cylinder when first piston is in the stroked position;
a floating second piston slidingly disposed within the piston cavity and dividing the piston cavity into a first chamber and a second chamber, the first chamber containing a first fluid, and the second chamber containing a second fluid, movement of the first piston toward the stroked position compressing the second fluid to produce a spring force that resists movement of the first piston toward the stroked position; and a rebound assembly mounted to and extending radially outward from the first piston, the rebound assembly dividing a space between the first piston and the cylinder into a third chamber and a fourth chamber, the third chamber being in fluid communication with the first chamber through at least one aperture that extends through the first piston from the first chamber to the third chamber, the third chamber being in fluid communication with the fourth chamber through the rebound assembly,
wherein movement of the cylinder toward the extended position drives a first fluid from the first chamber and the fourth chamber into the third chamber, and movement of the cylinder toward the stroked position drives the first fluid from the third chamber into the first chamber and the fourth chamber, movement of the first fluid into and out of the fourth chamber being limited to first fluid that flows through the rebound assembly.

2. The main fitting of claim 1, wherein the first fluid is oil.

3. The main fitting of claim 1, wherein the second fluid is a gas.

4. The main fitting of claim 1, further comprising a bearing mounted to a second end of the cylinder, wherein the bearing engages the first piston to limit translation of the first piston relative to the cylinder to a longitudinal direction.

5. The main fitting of claim 4, wherein the cylinder further comprises an inwardly projecting lip, the bearing being disposed between the lip and a locking ring mounted to the cylinder.

6. The main fitting of claim 4, wherein the bearing comprises a dynamic seal that sealingly engages the first piston.

7. A landing gear assembly for an aircraft, comprising the main fitting according to claim 1.

8. The main fitting of claim 1, wherein the first fluid flows through the rebound assembly at a first rate when the first piston moves toward the stroked position and at a second rate when the first piston moves toward the extended position.

9. The main fitting of claim 8, wherein the first rate is greater than the second rate.

10. The main fitting of claim 8, wherein the rebound assembly comprises a rebound ring slidably mounted within a groove of a rebound ring retainer, the rebound ring retainer being mounted to the piston.

11. The main fitting of claim 10, wherein the rebound ring engages a lower face of the groove when the first piston moves toward the stroked position.

12. The shocks strut of claim 11, wherein the rebound ring engages an upper face of the groove when the first piston moves toward the extended position.

13. A main fitting, comprising:
an elongate first piston having an internal piston cavity, the first piston having a first end and a second end, a wheel being mounted to the second end of the first piston;
a cylinder having an internal cylinder cavity, the first piston extending through the cylinder cavity and being configured for reciprocating motion between an extended position and a stroked position, the first end of the first piston extending from a first end of the cylinder when first piston is in the stroked position;
a floating second piston slidingly disposed within the piston cavity and dividing the piston cavity into a first chamber and a second chamber, the first chamber containing a first fluid, and the second chamber containing a second fluid, movement of the first piston toward the stroked position compressing the second fluid to produce a spring force that resists movement of the first piston toward the stroked position; and a rebound assembly mounted to and extending radially outward from the first piston, the rebound assembly dividing a space between the first piston and the cylinder into a third chamber and a fourth chamber, the third chamber being in fluid communication with the first chamber through at least one aperture that extends through the first piston from the first chamber to the third chamber, the third chamber being in fluid communication with the fourth chamber through the rebound assembly; and a bearing mounted to a second end of the cylinder, wherein the bearing engages the first piston to limit translation of the first piston relative to the cylinder to a longitudinal direction, wherein the cylinder further includes an inwardly projecting lip, the bearing being disposed between the lip and a locking ring mounted to the cylinder, and movement of the cylinder toward the extended position drives a first fluid from the first chamber and the fourth chamber into the third chamber, and movement of the cylinder toward the stroked position drives the first fluid from the third chamber into the first chamber and the fourth chamber, movement of the first fluid into and out of the fourth chamber being limited to first fluid that flows through the rebound assembly.

\* \* \* \* \*